US011106921B2

(12) United States Patent
Yang (10) Patent No.: US 11,106,921 B2
(45) Date of Patent: Aug. 31, 2021

(54) METHOD AND APPARATUS FOR DETERMINING ROAD INFORMATION, AND VEHICLE

(71) Applicant: BAIDU ONLINE NETWORK TECHNOLOGY (BEIJING) CO., LTD., Beijing (CN)

(72) Inventor: Yang Yang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 32 days.

(21) Appl. No.: 16/729,324

(22) Filed: Dec. 28, 2019

(65) Prior Publication Data

US 2020/0210716 A1    Jul. 2, 2020

(30) Foreign Application Priority Data

Dec. 29, 2018  (CN) .......................... 201811637219.7

(51) Int. Cl.
*G06K 9/00*  (2006.01)
*G06T 7/579*  (2017.01)
(Continued)

(52) U.S. Cl.
CPC .......... *G06K 9/00791* (2013.01); *G06K 9/40* (2013.01); *G06T 7/579* (2017.01); *G06T 7/60* (2013.01);
(Continued)

(58) Field of Classification Search
None
See application file for complete search history.

(56) References Cited

U.S. PATENT DOCUMENTS

2011/0222732 A1*  9/2011  Higuchi .......... B60W 30/18145
                                                  382/104
2015/0332114 A1* 11/2015  Springer ............ G06K 9/00805
                                                  348/148
(Continued)

FOREIGN PATENT DOCUMENTS

CN    105303554 A    2/2016
CN    106197374 A    12/2016
(Continued)

OTHER PUBLICATIONS

Verical Corner Line Detection on Buildings in Quasi-Manhattan World. Zhong et al. (Year: 2013).*

(Continued)

*Primary Examiner* — Delomia L Gilliard
(74) *Attorney, Agent, or Firm* — Lathrop GPM LLP (57) ABSTRACT

The present disclosure provides a method and an apparatus for determining road information, a vehicle and a computer readable storage medium. The method includes: triggering the camera to capture M images during driving, M being an integer not less than 2; performing three-dimensional reconstruction based on the M images to obtain a three-dimensional model; determining a first vector of the three-dimensional model, the first vector indicating a gravity direction in the three-dimensional model; and determining the road information of a road where the vehicle is located based on M spatial positions and the first vector, the M spatial positions being spatial positions of a center of the camera in the three-dimensional model at M time points and the M images are captured by the camera respectively at the M time points, the road information including a slope type and/or a slope value.

17 Claims, 5 Drawing Sheets

(51) Int. Cl.
*G06K 9/40* (2006.01)
*G06T 7/60* (2017.01)

(52) U.S. Cl.
CPC ............... *G06T 2207/10028* (2013.01); *G06T 2207/30252* (2013.01)

(56) References Cited

U.S. PATENT DOCUMENTS

2018/0101739 A1* 4/2018 Zhang ................ G06K 9/00805
2019/0197704 A1* 6/2019 Okubo .................... G06T 7/251

FOREIGN PATENT DOCUMENTS

| DE | 102011118171 | A1 | 5/2013 |
| EP | 2325824 | A1 | 5/2011 |
| JP | 2013092820 | A | 5/2013 |

OTHER PUBLICATIONS

High Accuracy Monocular SFM and Scale Correction for Autonomous Driving. Song et al. (Year: 2015).*
European Patent Application No. 19219344.9 extended Search and Opinion dated May 7, 2020, 9 pages.
Song, S. et al., "High Accuracy Monocular SFM and Scale Correction for Autonomous Driving" IEEE Transactions on Pattern Analysis and Machine Intelligence, vol. 38, No. 4, pp. 730-743, Apr. 1, 2016.
Xiao, J. et al., "Image-based street-side city modeling" ACM Transactions on Graphics, Dec. 2009, vol. 28, No. 5, pp. 1-12.
Zhong, B. et al., "Vertical corner line detection on buildings in quasi-Manhattan world", 2013 IEEE International Conference on Image Processing, Sep. 15, 2013, pp. 3064-3068.
Chinese Patent Application No. 201811637219.7, Office Action dated Jan. 9, 2020, 6 pages.
Chinese Patent Application No. 201710541569.2, English translation of Office Action dated Jan. 9, 2020, 8 pages.

* cited by examiner

METHOD AND APPARATUS FOR DETERMINING ROAD INFORMATION, AND VEHICLE

CROSS REFERENCE TO RELATED APPLICATION

This application claims priority and benefit to Chinese Application No. 201811637219.7, filed on Dec. 29, 2018, the entire content of which is incorporated herein by reference.

FIELD

Embodiments of the present disclosure relates to the technical field of vehicle engineering, and more particularly, to a method and an apparatus for determining road information, a vehicle and a computer readable storage medium.

BACKGROUND

With the rapid development of the technical field of vehicle engineering, the use of automotive vehicles is becoming more and more common, and these vehicles have become one of the most important means of transportation in people's daily lives.

SUMMARY

Embodiments of the present disclosure provide a method for determining road information, which may be applicable to a vehicle equipped with a camera. The method includes:
triggering the camera to capture M images during driving, M being an integer greater than or equal to 2;
performing three-dimensional reconstruction based on the M images to obtain a three-dimensional model;
determining a first vector of the three-dimensional model, the first vector being configured to indicate a gravity direction in the three-dimensional model; and
determining the road information of a road where the vehicle is located based on M spatial positions and the first vector, the M spatial positions being spatial positions of a center of the camera in the three-dimensional model at M time points and the M images are captured by the camera respectively at the M time points, the road information includes a slope type and/or a slope value.

Embodiments of the present disclosure provide a vehicle. The vehicle includes a processor, a memory and a computer program stored on the memory and executable by the processor. When the computer program is executed by the processor, the above method for determining road information is executed.

Embodiments of the present disclosure provide a non-transitory computer readable storage medium, having a computer program stored thereon. When the computer program is executed by a processor, the above method for determining road information is executed.

BRIEF DESCRIPTION OF THE DRAWINGS

In order to clearly illustrate technical solutions of embodiments of the present disclosure, a brief description of drawings used in embodiments of the present disclosure is given below. The drawings included in this specification only represent some of the embodiments of the present disclosure, and for those skilled in the art, other drawings can be obtained according to these drawings without a creative process.

DETAILED DESCRIPTION

Descriptions will be made to technical solutions in the embodiments of the present disclosure with accompanying drawings. The embodiments described here are only part of the embodiments of the present disclosure and are not all possible embodiments of the present disclosure. Based on the embodiments of the present disclosure, other embodiments obtained by those skilled in the art without creative labor are within scope of the present disclosure.

Currently, autonomous driving technology is widely used in vehicles. In general, a vehicle may be on a non-sloped road, an up-sloped road or a down-sloped road. However, in a driving process of the autonomous driving technology, the vehicle may not be able to detect whether the vehicle is on the up-sloped road or the down-sloped road or to detect the slope of a road. As a result, the vehicle may not be controlled precisely based on an actual situation of the road where it is located. Consequently, the vehicle may be poorly controlled and may not function properly on the road.

Therefore, embodiments of the present disclosure provide a method and an apparatus for determining road information, a vehicle and a computer readable storage medium, to solve the problem wherein an autonomous vehicle is poorly controlled and not functioning properly on the road.

In embodiments of the present disclosure, the vehicle may trigger the camera to obtain the M images during driving, and perform the three-dimensional reconstruction based on the M images, to obtain the three-dimensional model. The road information of the road where the vehicle is located may be determined based on the first vector in the three-dimensional model and the M spatial positions corresponding to the M images. The first vector is configured to indicate a gravity direction in the three-dimensional model. The vehicle may be controlled based on the road information. The road information may include the slope type and/or the slope value. Consequently, in embodiments of the present disclosure, with the M images captured during driving, the vehicle may detect whether it is on an up-sloped road or a down-sloped road and detect the slope value, to provide reference information for controlling the vehicle. The vehicle may be controlled by itself precisely based on the reference information. For example, parameters such as the gas pedal, the brake, etc., may be adjusted purposefully. Consequently, compared with the prior art, embodiments of the present disclosure may improve control performance of the vehicle and enhance safety of driving.

Figure 1:
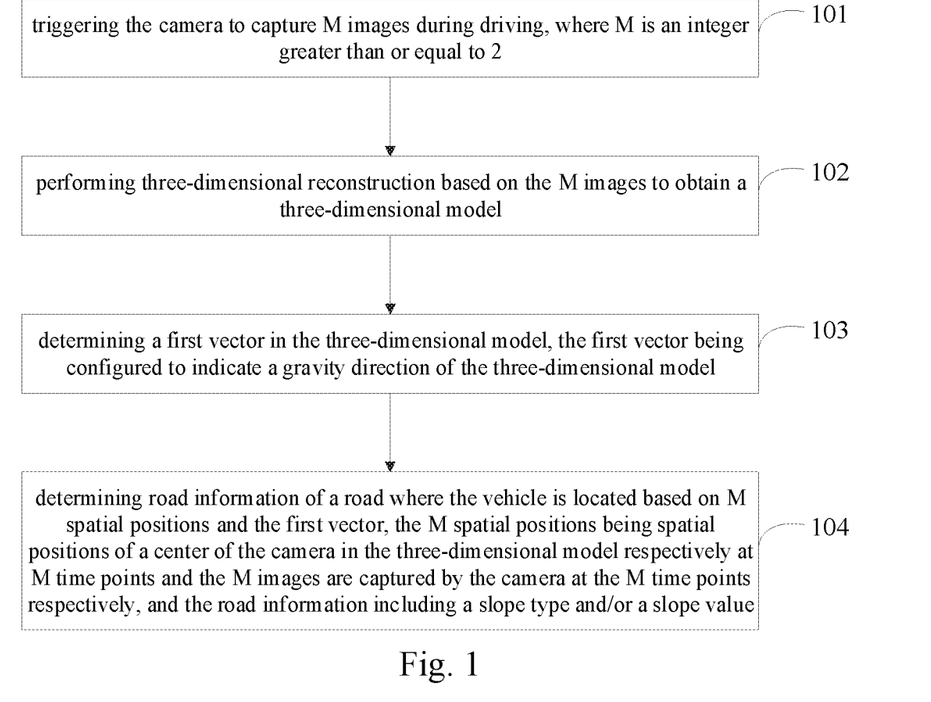
FIG. 1 is a flowchart illustrating a method for determining road information according to some embodiments of the present disclosure.

The method for determining road information according to some embodiments of the present disclosure will be described below. FIG. 1 is a flowchart illustrating a method for determining road information according to some embodiments of the present disclosure. As illustrating in FIG. 1, the method is applicable to a vehicle (for example, an intelligent vehicle) provided with a camera. The method may include the following.

At block 101, the camera is triggered to capture M images during driving, where M is an integer greater than or equal to 2.

In detail, M may equal to eight, ten, twenty, thirty or may be other integers, which are not enumerated herein.

In the block 101, the vehicle may trigger the camera to capture M images consecutively. In an example, the vehicle may trigger the camera to obtain a video and extract M consecutive images from the video. To facilitate understanding of the present disclosure for those skilled in the art, a case where the vehicle triggers the camera to capture M consecutive images may be taken as an example for description in the present disclosure.

At block 102, three-dimensional reconstruction is performed based on the M images, to obtain a three-dimensional model.

For example, the vehicle is located in a parking lot. In the block 102, the vehicle may perform the three-dimensional reconstruction of the parking lot based on the M images, to obtain the three-dimensional model. The three-dimensional model may include sparse point cloud for describing the parking lot and a capturing position for each image. Performing the three-dimensional reconstruction to obtain the three-dimensional model may be described below.

Generally, when the camera captures the image, a point A (X, Y, Z, 1) in a world coordinate system may be projected as a point a (x, y, 1) in an image coordinate system. Without taking distortion into account, a relationship between the two points may be expressed as formula (1).

$$a = K[R|t]A \quad (1)$$

where, K is an intrinsic parameter of the camera, which may be an intrinsic parameter matrix of the camera for example and represent a focal length. R and t are extrinsic parameters of the camera. R represents a rotation matrix of a current image relative to a reference image and t represents a translation matrix of the current image relative to the reference image.

From a formula (2), projection from the world coordinate system to the image coordinate system may be expressed by a projection matrix P.

$$P = K[R|t] \quad (2)$$

Figure 2:
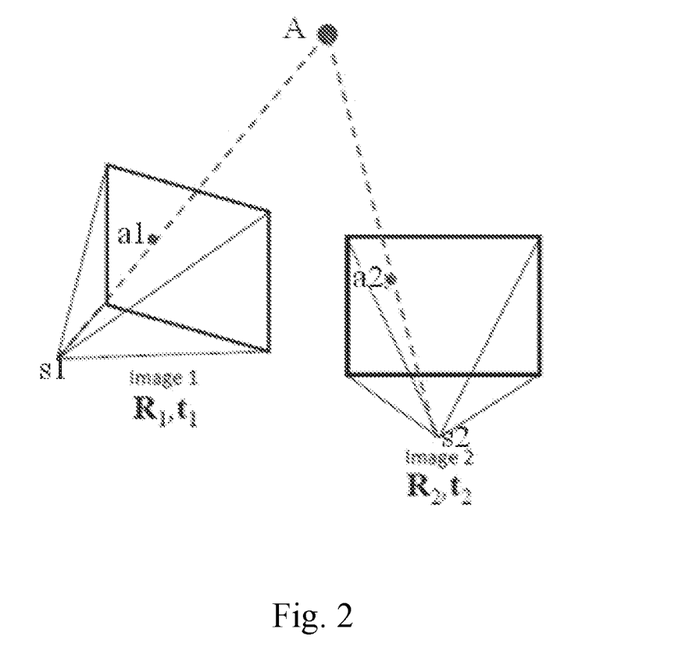
FIG. 2 is a schematic diagram illustrating a relation between a pixel a1 in image 1 and a pixel a2 in image 2.

Any two of the M images may include respective pixels both corresponding to a same point of the world coordinate system. As illustrated in FIG. 2, for example, the M images include a first image 1 and a second image 2. Both a pixel a1 in the first image 1 and a pixel a2 in the second image 2 correspond to the point A in the world coordinate system. In combination with the above formula (2), formula (3) and formula (4) may be obtained.

$$a_1^T F a_2 = 0 \quad (3)$$

$$F = K_2^{-T} R_2 K_1^T [K_1 R_2^T t_2] \quad (4)$$

where, F is a fundamental matrix (for example, a 3×3 matrix), $K_2$ is an intrinsic parameter matrix corresponding to the second image 2, $R_2$ is a rotation matrix corresponding to the second image 2, $K_1$ is an intrinsic parameter matrix corresponding to the second image 1, and $t_2$ is a translation matrix corresponding to the second image 2.

It should be pointed out that since the first image 1 and the second image 2 are captured by the same camera, it may be considered that $K_1$ equals to $K_2$. For example, both $K_1$ and $K_2$ equal to K. Since capturing positions of the first image 1 and the second image 2 are different, extrinsic parameters corresponding to the first image 1 and the second image 2 are different, i.e., $R_1$ does not equal to $R_2$ and $t_1$ does not equal to $t_2$. As long as the fundamental matrix F is obtained, K, R and t corresponding to the first image 1 and K, R and t corresponding to the second image 2 may be obtained by decomposing F. That is, K, $R_1$, $t_1$, $R_2$ and $t_2$ may be obtained.

In detail, to calculate F, feature points (for example, sfit (scale-invariant feature transform) feature points) of the first image 1 and the second image 2 may be extracted. The feature points may be matched to obtain several feature point pairs (for example, thousands of feature point pairs). Each feature point pair includes one feature point in the first image 1 and one feature point in the second image 2. Two feature points in each feature point pair correspond to the same point in the world coordinate system. Based on the several feature point pairs and the formula (3), a set of equations including several equations may be obtained. In the case where the number of equations is much larger than the number of unknown values, nine elements constituting F may be obtained using random least square. Therefore, F may be obtained through calculation.

After F is obtained, K, $R_1$, $t_1$, $R_2$ and $t_2$ may be obtained. For the first image 1, a viewing direction of the camera corresponding to the first image 1 may be represented by $R_1(3, :)^T$, and a position s1 of the center of the camera corresponding to the first image 1 may be represented by $-R_1^T t_1$. $R_1(3, :)T$ may refer to a transpose of a third column of $R_1$ which is a 3×3 matrix. For the second image 2, a viewing direction of the camera corresponding to the second image 2 may be represented by $R_2(3, :)^T$, and a position s2 of the center of the camera corresponding to the second image 2 may be represented by $-R_2^T t_2$. $R_2(3, :)T$ refers to a transpose of a third column of $R_2$ which is a 3×3 matrix. As illustrated in FIG. 2, the point A in the three-dimensional coordinate system may be obtained by calculating an intersection of a line along the line segment s1a1 and a line along the line segment s2a2.

It should be noted that the present disclosure is described by taking the first image 1 and the second image 2 as examples. The processing of remaining images included in the M images may refer to the forgoing description, and thus details are not described herein again. Consequently, in embodiments of the present disclosure, the intrinsic parameters and the extrinsic parameters of the camera may be obtained with an SFM (structure form motion) algorithm (which is an offline algorithm for performing the three-dimensional reconstruction based on captured disordered pictures). The three-dimensional model may be formed with the intrinsic parameters of the camera, extrinsic parameters of the camera corresponding to each image and multiple points in the three-dimensional coordinate system.

It should be pointed out that, the three-dimensional reconstruction may consider the distortion. In this case, before establishing the relationship between points in the world coordinate system and points in the image coordinate system, undistorted parameters of coordinates of the points in the image coordinate system may be converted to distorted parameters before putting into use.

At block 103, a first vector in the three-dimensional model is determined. The first vector is configured to indicate a gravity direction of the three-dimensional model.

In the block 103, the vehicle may determine the first vector in the three-dimensional model based on all of the M images. In an example, the vehicle may determine the first vector in the three-dimensional model based on some of the M images.

At block 104, road information of the road where the vehicle is located is determined based on M spatial positions and the first vector. The M spatial positions are spatial positions of the center of the camera in the three-dimensional model respectively at M time points, and the M images are captured by the camera respectively at the M time points. The road information may include a slope type and/or a slope value.

In detail, embodiments of the present disclosure may include three slope types, i.e., a first type 1, a second type 2 and a third type 3. The first type 1 is used to indicate an up-sloped road where the vehicle is located, the second type 2 is used to indicate a down-sloped road where the vehicle is located, and the third type 3 is used to indicate a non-sloped road where the vehicle is located.

It should be noted that the position of the center of the camera corresponding to each image may be obtained at block 103. Each position of the center of the camera is a spatial position, such that M spatial positions may be determined. A movement trajectory of the camera may be obtained according to the M spatial positions. Since the camera is fixed on the vehicle all the time, the movement trajectory of the camera may be determined as the movement trajectory of the vehicle. Moreover, since the vehicle is always close to the road during driving, an angle relationship between the movement trajectory of the vehicle and the first vector may be closely related to the slope type and the slope value. Therefore, the road information of the road where the vehicle is located may be determined based on the M spatial positions and the first vector.

In embodiments of the present disclosure, the vehicle may be configured to trigger the camera to obtain the M images during driving and perform the three-dimensional reconstruction based on the M images, to obtain the three-dimensional model. The road information of the road where the vehicle is located may be determined by the vehicle based on the first vector in the three-dimensional model and the M spatial positions corresponding to the M images. The first vector is configured to indicate the gravity direction in the three-dimensional model. The vehicle may be controlled based on the road information. The road information may include the slope type and/or the slope value. Therefore, in embodiments of the present disclosure, with the M images captured during driving, the vehicle may detect whether it is on an up-sloped road or a down-sloped road and detect the slope value, to provide reference information for controlling the vehicle. The vehicle may be controlled by itself precisely based on the reference information. For example, parameters such as the gas pedal, the brake, etc., may be adjusted purposefully. Consequently, compared with the prior art, embodiments of the present disclosure may improve control of the vehicle and enhance safe driving.

Figure 3:
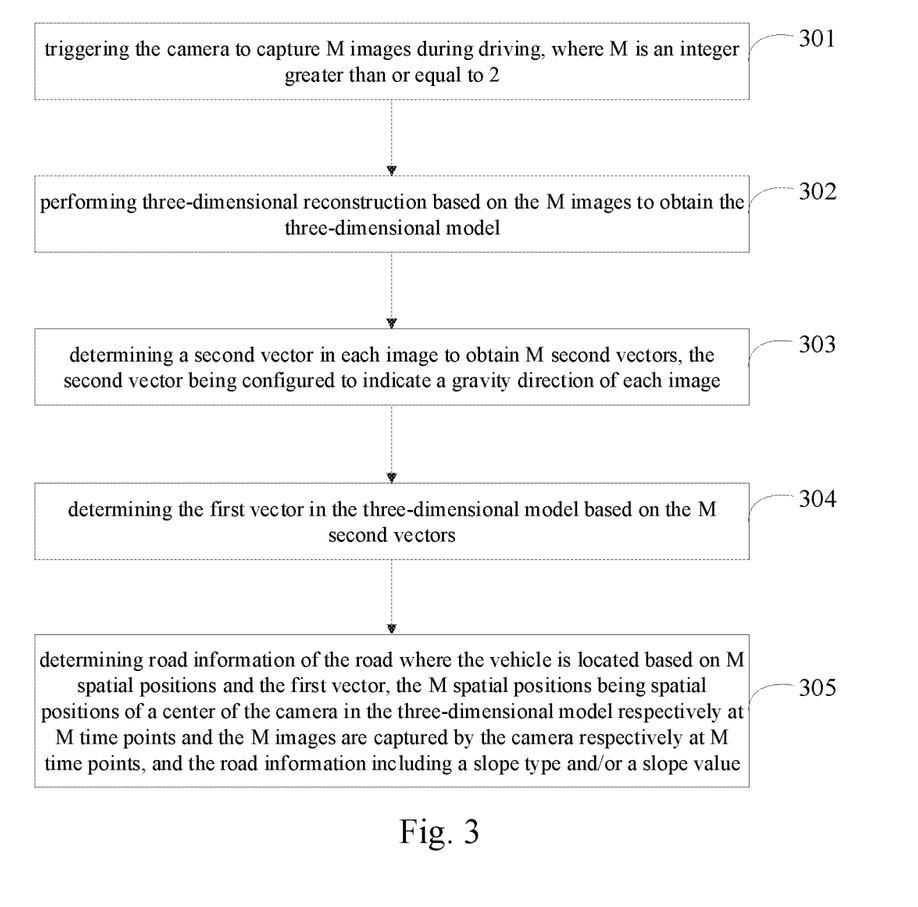
FIG. 3 is a flowchart illustrating a method for determining road information according to some embodiments of the present disclosure.

FIG. 3 is a flowchart illustrating a method for determining road information according to some embodiments of the present disclosure. Embodiment illustrated in FIG. 3 mainly differs from embodiments illustrated in FIG. 1 in a specific manner for determining the first vector in the three-dimensional model. As illustrated in FIG. 3, the method may include the following.

At block 301, the camera is triggered to capture M images during driving, where M is an integer greater than or equal to 2.

At block 302, the three-dimensional reconstruction is performed based on the M images to obtain the three-dimensional model.

Implementations of the block 301 and the block 302 may refer to the descriptions of block 101 and block 102, and details are not described herein again.

At block 303, a second vector in each image may be determined to obtain M second vectors. The second vector in each image is configured to indicate a gravity direction of each image.

The M second vectors and the M images have a one-to-one correspondence to each other.

In some embodiments, the block 303 may include determining an intersection of lines projected from parallel vertical straight lines in each image, and determining the second vector in the image based on the intersection.

In general, an artificial building may exist in each image. Since an image of the artificial buildings is mostly composed of vertical straight lines, vertical straight lines in the image may be regarded as the gravity direction. In a projected space, a position of the intersection of lines projected from parallel vertical straight lines may be related to the direction of the vertical straight lines. Therefore, for each of the M images, the vehicle may calculate an intersection of lines projected from the parallel vertical straight lines in the images based on theories of ends point regarding to parallel lines. For example, coordinates of the intersection are $(x_m, y_m)$, coordinates of the second vector determined by the vehicle may be $(x_m, y_m, 1)$. Consequently, with this manner, the vehicle may determine the second vector in each image quickly and easily.

At block 304, the first vector in the three-dimensional model is determined based on the M second vectors.

In an implementation, the three-dimensional model includes intrinsic parameters of the camera and the extrinsic parameters of the camera corresponding to each image.

Determining the first vector in the three-dimensional model based on the M second vectors includes the following. A third vector in the three-dimensional model is obtained for each image based on the intrinsic parameters, the extrinsic parameters and the second vector. M third vectors may be determined for the M images. The first vector in the three-dimensional model is determined based on the M third vectors.

For each image, the third vector may be calculated according to a formula (5).

$$Y = R^T K^{-1} y \qquad (5)$$

where, Y is the third vector in the three-dimensional model, R is a rotation matrix of a camera corresponding to each image, K is an intrinsic parameter matrix of the camera, and y is the second vector in each image.

With this implementation, M third vectors may be obtained through mapping the second vector in each image into the three-dimensional model. The first vector may be determined based on the M third vectors. Consequently, the process of determining the third vector is easy.

At block 305, the road information of the road where the vehicle is located is determined based on the M spatial positions and the first vector. The M spatial positions are spatial positions of the center of the camera in the three-dimensional model respectively at M time points and the M images are captured by the camera at the M time points. The link information includes the slope type and/or the slope value.

Implementations of the block 305 may refer to descriptions of the block 104, and details are not described herein again.

In embodiments of the present disclosure, the vehicle may trigger the camera to capture the M images during driving, and perform the three-dimensional reconstruction based on the M images, to obtain the three-dimensional model. The vehicle may determine the M second vectors corresponding to the M images and determine the first vector in the three-dimensional model based on the M second vectors. The vehicle may determine the road information of the road where the vehicle is located based on the first vector and the M spatial positions corresponding to the M images. The vehicle may be controlled based on the road information. The road information includes the slope type and/or the slope value. Consequently, in embodiments of the present disclosure, with the M images captured during driving, the vehicle may obtain the first vector for determining the road information and may detect the slope type and the slope value based on the road information to provide reference information for controlling the vehicle. The vehicle may be controlled by itself precisely based on the reference information. Consequently, compared with the prior art, embodiments of the present disclosure may improve control performance of the vehicle and enhance safety of driving.

In an example, determining the first vector in the three-dimensional model based on the M third vectors may include the following.

A vector group is determined for each third vector to obtain M vector groups. The vector group corresponding to each third vector may include determined third vectors, from remaining third vectors, that an angle of each of the determined third vectors with respect to any other third vector is smaller than a preset angle. A vector group including a maximum number of determined third vectors is selected from the M vector groups as a target vector group. A third vector corresponding to the target vector group is obtained and an average vector of all the determined third vectors included in the target vector group is calculated. The average vector is determined as the first vector in the three-dimensional model.

The angle of each of the determined third vectors with respect to any other third vector refers to an absolute value of the angle between two vectors. A preset angle may be 2 degrees, 3 degrees, 4 degrees or 5 degrees. Certainly, the value of the preset angle is not limited thereto, and may be determined according to actual conditions, which is not limited in embodiment of the present disclosure.

For example, M is ten. The vehicle may determine 10 third vectors corresponding to 10 images. The 10 third vectors may be represented by $\beta1$ to $\beta10$. The vehicle may determine a vector group for each of the vectors $\beta1$ to $\beta10$ to obtain 10 vector groups. The vector group corresponding to the vector $\beta1$ may include determined vectors from vectors $\beta2$ to $\beta10$ that the angle between each determined vector and the vector $\beta1$ is less than the preset angle. The vector group corresponding to the vector $\beta2$ may include determined vectors from the vector $\beta1$ and vectors $\beta3$ to $\beta10$ that the angle between each determined vector and the vector $\beta2$ is less than the preset angle. Elements included in the vector group corresponding to other vectors may be determined in a same manner, which is not described herein.

After 10 vector groups are obtained, the vehicle may compare the number of vectors included in each vector group with each other. For example, the vector group corresponding to the vector $\beta5$ has the maximum number of vectors, e.g., six vectors, including vectors $\beta1$, $\beta2$, $\beta4$, $\beta6$, $\beta7$ and $\beta8$. The vehicle may calculate an average vector of the vectors $\beta1$, $\beta2$, $\beta4$, $\beta6$, $\beta7$, $\beta8$ and $\beta5$ and determined the average vector as the first vector in the three-dimensional model.

Consequently, in embodiments of the present disclosure, by determining the vector groups and selecting the target vector group, some of the M third vectors may be screened out. The first vector for accurately representing the gravity direction of the three-dimensional model may be determined based on several third vectors each having a small angle, thereby guaranteeing accuracy of the road information.

Figure 4:
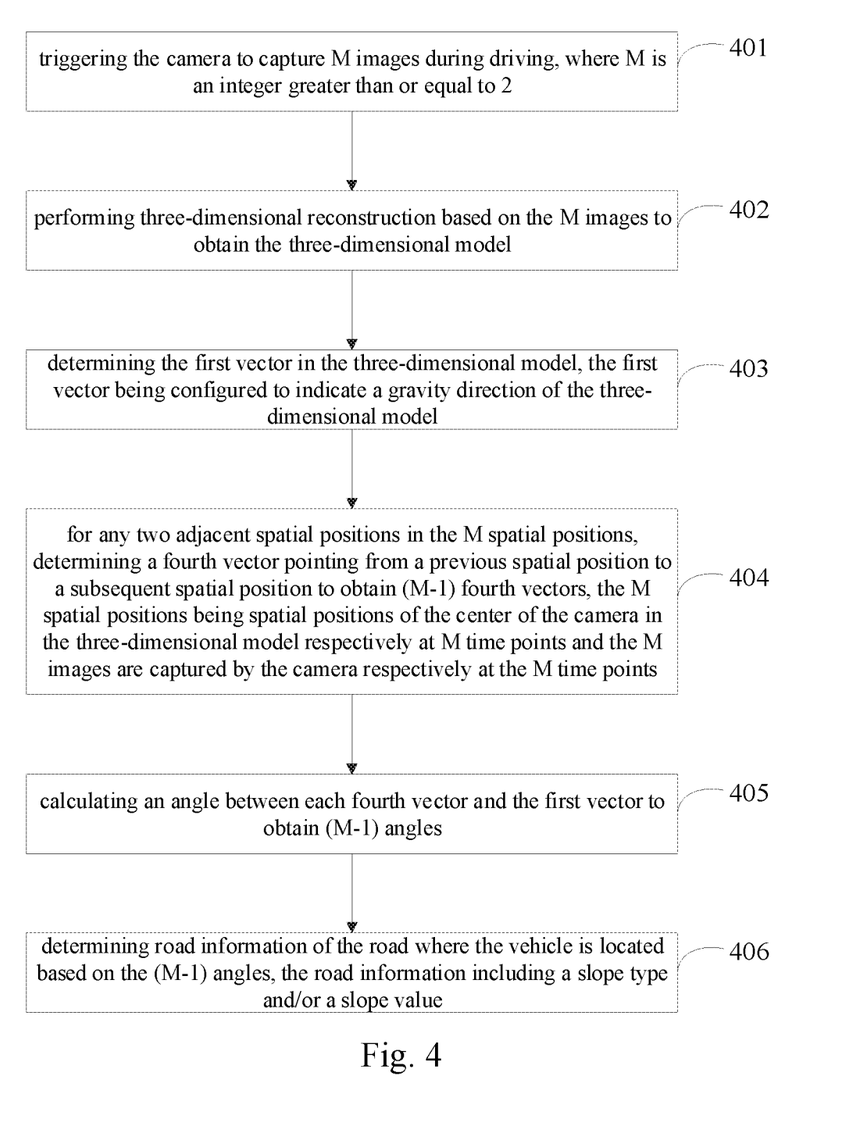
FIG. 4 is a flowchart illustrating a method for determining road information according to some embodiments of the present disclosure.

FIG. 4 is a flowchart illustrating a method for determining road information according to some embodiments of the present disclosure. Embodiments illustrated in FIG. 4 mainly differs from embodiments illustrated in FIG. 1 in a method for determining the road information of the road where the vehicle is located based on the M spatial positions and the first vector. As illustrated in FIG. 4, the method may include the following.

At block 401, the camera is triggered to capture M images during driving, where M is an integer greater than or equal to 2.

At block 402, the three-dimensional reconstruction is performed based on the M images to obtain the three-dimensional model.

At block 403, the first vector in the three-dimensional model is determined. The first vector is configured to indicate the gravity direction of the three-dimensional model. Implementations of blocks 401 to 403 may refer to descriptions of blocks 101 to 103, and details are not described herein again.

At block 404, for any two adjacent spatial positions in the M spatial positions, a fourth vector pointing from a previous spatial position to a subsequent spatial position is determined to obtain (M-1) fourth vectors. The M spatial positions are spatial positions of the center of the camera in the three-dimensional model respectively at M time points and the M images are captured by the camera at the M time points respectively.

Figure 5:
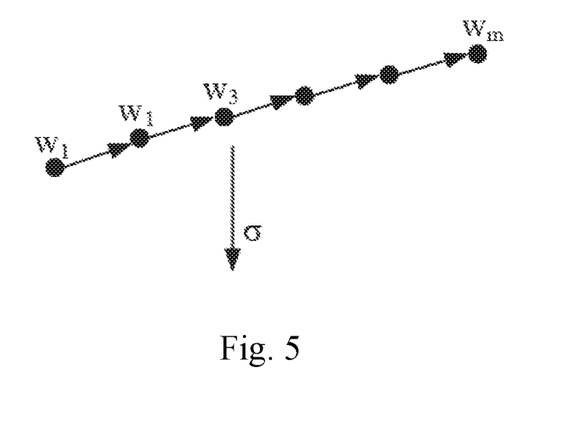
FIG. 5 is a schematic diagram illustrating distributions of M spatial positions.

In detail, as illustrated in FIG. 5, the M spatial positions may be represented by $w_1, w_2, w_3, \ldots, w_m$ in sequence. In the block 404, the vehicle may determine a fourth vector pointing from $w_1$ to $w_2$, a fourth vector pointing from $w_2$ to $w_3, \ldots$, and a fourth vector pointing from $w_{m-1}$ to $w_m$.

At block 405, an angle between each fourth vector and the first vector is calculated to obtain (M-1) angles.

The (M-1) fourth vectors have a one-to-one correspondence with the (M-1) angles. In detail, as illustrated in FIG. 5, the first vector may be represented by $\sigma$, and the vehicle may calculate the angle between $\sigma$ and each of the fourth vectors determined in the block 404.

At block 406, the road information of the road where the vehicle is located is determined based on the (M-1) angles. The road information includes the slope type and/or the slope vale.

In an example, the block 406 may include the following.

Statistical denoising is performed on the (M-1) angles. An average angle of angles left after the statistical denoising is obtained. The road information of the road where the vehicle is located is determined based on the average angle.

For example, M is ten. In the block 405, the vehicle may obtain 9 angles. The vehicle may perform the statistical denoising on the 9 angles. For example, the vehicle may calculate an average angle of the 9 angles, and compare the 9 angles with the average angle, respectively. In response to detecting that an angle difference between an angle from the 9 angles and the average angle exceeds a preset angle, the angle may be discarded.

For example, three angles are discarded from the nine angles after the statistical denoising, i.e., six angles are left. The vehicle may calculate an average angle of the six angles and determine the road information of the road where the vehicle is located based on the average angle of the six angles.

For example, in response to detecting that the average angle of the six angles left is greater than 90 degrees (as illustrated in FIG. 5), the slope type of the road where the vehicle is located may be determined as the first type 1. That is, the vehicle is on an up-sloped road. For example, in response to detecting that the average angle of the six angles is less than 90 degrees, the slope type of the road where the vehicle is located may be determined as the second type 2. That is, the vehicle is on a down-sloped road. In addition, there is a geometrical relationship between the average angle of the six angles and the slope value. In detail, when the average angle is 60 degrees, the slope value of the road where the vehicle is located is a complementary angle of 60 degrees, that is, 30 degrees.

With this method, the road information may be determined based on the average angle of the remaining angles left after the statistical denoising is performed on the (M-1) angles, such that the accuracy of information based on which the road information is determined may be ensured.

It should be noted that implementations of the block 406 is not limited thereto. For example, the vehicle may not perform statistical denoising, but directly determine the road information of the road where the vehicle is located based on the average angle of the (M-1) angles obtained in the block 405.

In embodiments of the present disclosure, the vehicle may trigger the camera to obtain the M images during driving, and perform the three-dimensional reconstruction based on the M images, to obtain the three-dimensional model. The vehicle may determine the first vector indicating the gravity direction in the three-dimensional model and the M spatial positions corresponding to the M images. The vehicle may obtain the (M-1) angles based on the M spatial positions and determine the road information of the road where the vehicle is located based on the (M-1) angels. The vehicle may be controlled based on the road information. The road information may include the slope type and/or the slope value. Consequently, in embodiments of the present disclosure, with the M images captured during driving, the vehicle may detect the slope type and the slope value based on the angle information, to provide reference information for controlling the vehicle. The vehicle may be controlled by itself precisely based on the reference information. For example, parameters such as the gas pedal, the brake, etc., may be adjusted purposefully. Consequently, compared with the prior art, embodiments of the present disclosure may improve control performance of the vehicle and enhance safety of driving.

In conclusion, the method for determining road information according to embodiments of the present disclosure may have the following beneficial effects. (1) The three-dimensional model where the vehicle is located during driving may be established with the continuous M images and an orientation of the camera and the position of the center of the camera corresponding to each image may be obtained. (2) The gravity direction in the three-dimensional model may be determined without calibrating the camera and a change of postures of the vehicle such as rotation and translation may be estimated (based on change of the orientation of the camera and change of the position of the center of the camera). (3) It may be detected whether the road ahead is an up-sloped road or a down-sloped road and the slope value may be determined, to provide the reference information for controlling the vehicle, thereby improving control of the vehicle and enhancing safe driving.

The apparatus for determining road information according to embodiments of the present disclosure is described below.

Figure 6:
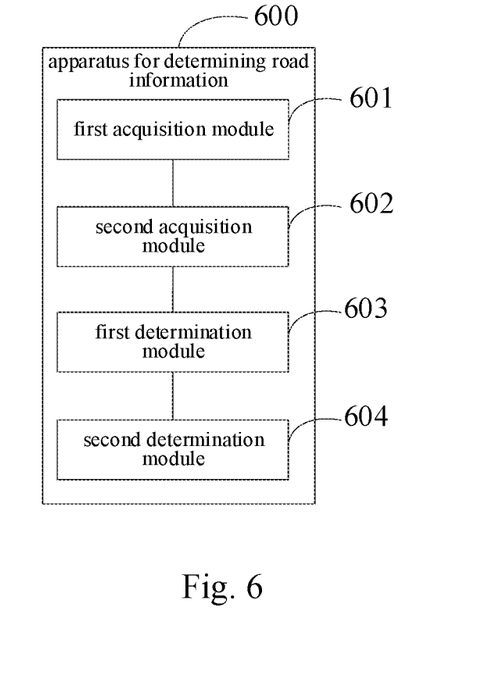
FIG. 6 is a block diagram illustrating an apparatus for determining road information according to some embodiments of the present disclosure.

FIG. 6 is a block diagram illustrating an apparatus 600 for determining road information according to embodiments of the present disclosure. As illustrated in FIG. 6, the apparatus 600 for determining road information may be applicable to a vehicle provided with a camera. The apparatus 600 may include a first acquisition module 601, a second acquisition module 602, a first determination module 603 and a second determination module 604.

The first acquisition module 601 may be configured to trigger the camera to capture M images during driving, where M is an integer greater than or equal to 2.

The second acquisition module 602 may be configured to perform three-dimensional reconstruction based on the M images to obtain the three-dimensional model.

The first determination module 603 may be configured to determine the first vector in the three-dimensional model. The first vector is configured to indicate a gravity direction of the three-dimensional model.

The second determination module 604 may be configured to determine road information of the road where the vehicle is located based on M spatial positions and the first vector. The M spatial positions are spatial positions of the center of the camera in the three-dimensional model respectively at M time points and the M images are captured by the camera respectively at the M time points. The link information includes a slope type and/or a slope value.

In an embodiment, the first determination module 603 may include a first acquisition sub-module and a first determination sub-module.

The first acquisition sub-module may be configured to determine a second vector in each image to obtain M second vectors. The second vector is configured to indicate the gravity direction of each image.

The first determination sub-module may be configured to determine the first vector in the three-dimensional model based on the M second vectors.

In an example, the first acquisition sub-module may be further configured to: determine an intersection of lines projected from parallel vertical straight lines in each image and determine the second vector in each image based on the intersection.

In an example, the three-dimensional model may include intrinsic parameters of the camera and extrinsic parameters of the camera corresponding to each image. The first determination sub-module may include an acquisition unit and a first determination unit.

The acquisition unit may be configured to calculate, for each image, a third vector in the three-dimensional model based on the intrinsic parameters, the extrinsic parameters and the second vector to obtain M third vectors.

The first determination unit may be configured to determine the first vector in the three-dimensional model based on the M third vectors.

In an example, the first determination unit may include: an acquisition sub-unit, a selection sub-unit and a determination sub-unit.

The acquisition sub-unit may be configured to determine a vector group for each third vector to obtain M vector groups. The vector group corresponding to each third vector may include determined third vectors, from remaining third vectors, that an angle of each of the determined third vectors with respect to any other third vector is smaller than a preset angle.

The selecting sub-unit may be configured to select a vector group including a maximum number of determined third vectors from the M vector groups as a target vector group.

The determination sub-unit may be configured to determine a third vector corresponding to the target vector group and an average vector of all the determined third vectors in the target vector group and determine the average vector as the first vector in the three-dimensional model.

In an example, the second determination module 604 may include a second acquisition sub-module, a third acquisition sub-module and a second determination sub-module.

The second acquisition sub-module may be configured to determine, for any two adjacent spatial positions in the M spatial positions, a fourth vector pointing from a previous spatial position to a subsequent spatial position to obtain (M-1) fourth vectors.

The third acquisition sub-module may be configured to calculate an angle between each fourth vector and the first vector to obtain (M-1) angles.

The second determination sub-module may be configured to determine the road information of the road where the vehicle is located based on the (M-1) angles.

In an example, the second determination sub-module may include a statistical denoising unit, a calculation unit and a second determination unit.

The statistical denoising unit may be configured to perform statistical denoising on the (M-1) angles.

The calculation unit may be configured to calculate an average angle of angles left after the statistical denoising.

The second determination unit may be configured to determine the road information of the road where the vehicle is located based on the average angle.

In embodiments of the present disclosure, the vehicle may trigger the camera to obtain the M images during driving and perform the three-dimensional reconstruction based on the M images, to obtain the three-dimensional model. The vehicle may determine the road information of the road where the vehicle is located based on the first vector in the three-dimensional model and the M spatial positions corresponding to the M images. The first vector is configured to indicate the gravity direction. The vehicle may be controlled based on the road information. The road information includes the slope type and/or the slope value. Consequently, in embodiments of the present disclosure, with the M images captured during driving, the vehicle may detect the slope type and detect the slope value to provide reference information for controlling the vehicle. The vehicle may be controlled by itself precisely based on the reference information. For example, parameters such as the gas pedal, the brake, etc., may be adjusted purposefully. Consequently, compared with the prior art, embodiments of the present disclosure may improve control performance of the vehicle and enhance safety of driving.

Figure 7:
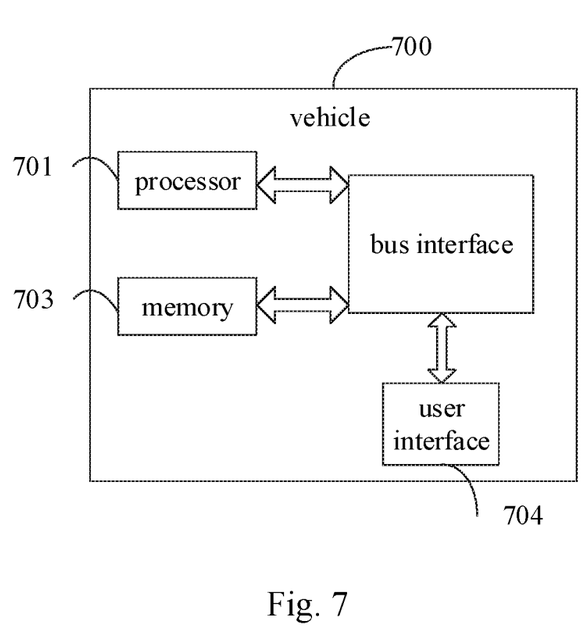
FIG. 7 is a block diagram illustrating a vehicle according to some embodiments of the present disclosure.

FIG. 7 is a block diagram illustrating a vehicle 700 according to embodiments of the present disclosure. As illustrated in FIG. 7, the vehicle 700 includes: a processor 701, a memory 703, a user interface 704 and a bus interface.

The vehicle 700 is provided with a camera. The processor 701 is configured to read programs in the memory 703 to execute the following.

The camera is triggered to capture M images during driving, where M is an integer greater than or equal to 2.

Three-dimensional reconstruction is performed based on the M images to obtain a three-dimensional model.

A first vector in the three-dimensional model is determined. The first vector is configured to indicate the gravity direction of the three-dimensional model.

Road information of the road where the vehicle is located is determined based on M spatial positions and the first vector. The M spatial positions are spatial positions of the center of the camera in the three-dimensional model respectively at M time points and the M images are captured by the camera respectively at the M time points. The road information includes a slope type and/or a slope value.

In FIG. 7, a bus architecture may include any number of interconnected buses and bridges, which are specifically coupled together by one or more processors represented by the processor 701 and various circuits of the memory represented by the memory 703. The bus architecture may also couple together various other circuits such as peripherals, voltage regulators, power management circuits, etc., which are well known in the art, and thus will not be described further herein. The bus interface provides an interface. For different user devices, the user interface 704 may further be an interface capable of externally or internally interfacing with a desired device, which includes, but is not limited to, a keypad, a display, a speaker, a microphone, a joystick, and so on.

The processor 701 is responsible for managing the bus architecture and for general processing, and the memory 703 may store data used by the processor 701 in performing operations.

In an example, the processor 701 is further configured to: determine a second vector in each image to obtain M second vectors. The second vector is configured to indicate the gravity direction of each image. In addition, the processor 701 is further configured to determine the first vector in the three-dimensional model based on the M second vectors.

In an example, the processor 701 is further configured to: determine an intersection of lines projected from parallel vertical straight lines in each image and determine the second vector in each image based on the intersection.

In an example, the three-dimensional model includes intrinsic parameters of the camera, and extrinsic parameters of the camera corresponding to each image.

The processor 701 is further configured to: calculate, for each image, a third vector in the three-dimensional model based on the intrinsic parameters, the extrinsic parameters and the second vector to obtain M third vectors and determine the first vector in the three-dimensional model based on the M third vectors.

In an example, the processor 701 is further configured to: determine a vector group for each third vector to obtain M vector groups. The vector group corresponding to each third vector includes determined third vectors, from remaining third vectors, that an angle of each of the determined third vectors with respect to any other third vector is smaller than a preset angle; select a vector group including a maximum number of determined third vectors from the M vector groups as a target vector group, and determine a third vector corresponding to the target vector group and an average vector of all the determined third vectors in the target vector group and determine the average vector as the first vector in the three-dimensional model.

In an example, the processor 701 is further configured to: determine, for any two adjacent spatial positions in the M spatial positions, a fourth vector pointing from a previous spatial position to a subsequent spatial position to obtain (M-1) fourth vectors; calculate an angle between each fourth vector and the first vector to obtain (M-1) angles; and determine the road information of the road where the vehicle is located based on the (M-1) angles.

In an example, the processor 701 is further configured to: perform statistical denoising on the (M-1) angles; calculate an average angle of angles left after the statistical denoising; and determine the road information of the road where the vehicle is located based on the average angle.

In this embodiment of the present disclosure, the vehicle 700 may trigger the camera to capture the M images during driving and perform the three-dimensional reconstruction based on the M images to obtain the three-dimensional model. The vehicle 700 may determine the road information of the road where the vehicle 700 is located based on the first vector in the three-dimensional model and the M spatial positions corresponding to the M images. The first vector is configured to indicate the gravity direction. The vehicle 700 may be controlled based on the road information. The road information includes the slope type and/or the slope value. Consequently, in embodiments of the present disclosure, with the M images captured during driving, the vehicle 700 may detect the slope type and the slope value, to provide reference information for controlling the vehicle 700. The vehicle 700 may be controlled by itself precisely based on the reference information. For example, parameters such as the gas pedal, the brake, etc., may be adjusted purposefully. Consequently, compared with the prior art, embodiments of the present disclosure may improve control performance of the vehicle 700 and enhance safety of driving.

Embodiments of the present disclosure further provide a vehicle, including the processor 701, the memory 703, a computer program stored on the memory 703 and executable by the processor 701. When the computer program is executed by the processor 701, the method for determining road information according to embodiments of the present disclosure may be executed and same technical effects may be achieved. In order to avoid repetition, the details are not repeated.

An embodiment of the present disclosure further provides a computer readable storage medium having a computer program stored thereon. When the computer program is executed by the processor 701, the method for determining road information may be executed and same technical effects may be achieved. In order to avoid repetition, the details are not repeated. The computer readable storage medium may be, for example, a read-only memory (ROM), a random access memory (RAM), a magnetic disk, or an optical disk.

Embodiments of the present disclosure are described above with reference to the drawings. However, the present disclosure is not restricted to the foregoing specific embodiments, which are illustrative, rather than restrictive. Inspired by the present disclosure, for a person skilled in the art, without departing from the principle of the present disclosure and the protection scope of the attached claims, various forms may be made, which are covered by the protection scope of the present disclosure.

What is claimed is:

1. A method for determining road information, applicable to a vehicle provided with a camera, wherein the method comprises:

triggering the camera to capture M images during driving, M being an integer greater than or equal to 2;

performing three-dimensional reconstruction based on the M images to obtain a three-dimensional model;

determining a first vector in the three-dimensional model, the first vector being configured to indicate a gravity direction of the three-dimensional model; and determining road information of a road where the vehicle is located based on M spatial positions and the first vector, the M spatial positions being spatial positions of the center of the camera in the three-dimensional model respectively at M time points and the M images are captured by the camera respectively at the M time points, and the road information comprises a slope type and/or a slope value;

wherein determining the road information of the road where the vehicle is located based on the M spatial positions and the first vector comprises:

determining, for any two adjacent spatial positions in the M spatial positions, a fourth vector pointing from a previous spatial position to a subsequent spatial position to obtain (M-1) fourth vectors;

calculating an angle between each fourth vector and the first vector to obtain (M-1) angles; and determining the road information of the road where the vehicle is located based on the (M-1) angles.

2. The method of claim 1, wherein determining the road information of the road where the vehicle is located based on the (M-1) angles comprises:

performing statistical denoising on the (M-1) angles;

calculating an average angle of angles left after the statistical denoising; and determining the road information of the road where the vehicle is located based on the average angle.

3. The method of claim 1, wherein determining the first vector in the three-dimensional model comprises:

determining a second vector in each image to obtain M second vectors; the second vector being configured to indicate a gravity direction of each image; and determining the first vector in the three-dimensional model based on the M second vectors.

4. The method of claim 3, wherein determining the second vector in each image comprises:

determining, for each image, an intersection of lines projected from parallel vertical straight lines in each image; and determining the second vector in each image based on the intersection.

5. The method of claim 3, wherein the three-dimensional model comprises intrinsic parameters of the camera, and extrinsic parameters of the camera corresponding to each image; and determining the first vector in the three-dimensional model based on the M second vectors comprises:

calculating, for each image, a third vector in the three-dimensional model based on the intrinsic parameters, the extrinsic parameters and the second vector to obtain M third vectors; and determining the first vector in the three-dimensional model based on the M third vectors.

6. The method of claim 5, wherein determining the first vector in the three-dimensional model based on the M third vectors comprises:

determining a vector group for each third vector to obtain M vector groups, the vector group corresponding to each third vector comprises determined third vectors, from remaining third vectors, that an angle of each of the determined third vectors with respect to any other third vector is smaller than a preset angle;

selecting a vector group comprising a maximum number of determined third vectors the M vector groups as a target vector group; and determining a third vector corresponding to the target vector group and an average vector of all the determined third vectors comprised in the target vector group and determining the average vector as the first vector in the three-dimensional model.

7. A vehicle, comprising a processor, a memory, a computer program stored on the memory and executable by the processor, wherein the vehicle is further provided with a camera, when the computer program is executed by the processor, the processor is configured to:

trigger the camera to capture M images during driving, M being an integer greater than or equal to 2;

perform three-dimensional reconstruction based on the M images to obtain a three-dimensional model;

determine a first vector in the three-dimensional model, the first vector being configured to indicate a gravity direction of the three-dimensional model; and determine road information of a road where the vehicle is located based on M spatial positions and the first vector, the M spatial positions being spatial positions of the center of the camera in the three-dimensional model respectively at M time points and the M images are captured by the camera respectively at the M time points, and the road information comprises a slope type and/or a slope value;

wherein the processor is configured to determine the road information of the road where the vehicle is located based on the M spatial positions and the first vector by:

determining, for any two adjacent spatial positions in the M spatial positions, a fourth vector pointing from a previous spatial position to a subsequent spatial position to obtain (M-1) fourth vectors;

calculating an angle between each fourth vector and the first vector to obtain (M-1) angles; and determining the road information of the road where the vehicle is located based on the (M-1) angles.

8. The vehicle of claim 7, wherein the processor is configured to determine the first vector in the three-dimensional model by:

determining a second vector in each image to obtain M second vectors; the second vector being configured to indicate a gravity direction of each image; and determining the first vector in the three-dimensional model based on the M second vectors.

9. The vehicle of claim 7, wherein the processor is configured to determine the road information of the road where the vehicle is located based on the (M-1) angles by:

performing statistical denoising on the (M-1) angles;

calculating an average angle of angles left after the statistical denoising; and determining the road information of the road where the vehicle is located based on the average angle.

10. The vehicle of claim 8, wherein the processor is configured to determine the second vector in each image by:

determining, for each image, an intersection of lines projected from parallel vertical straight lines in each image; and determining the second vector in each image based on the intersection.

11. The vehicle of claim 8, wherein the three-dimensional model comprises intrinsic parameters of the camera, and extrinsic parameters of the camera corresponding to each image; and the processor is configured to determine the first vector in the three-dimensional model based on the M second vectors by:

calculating, for each image, a third vector in the three-dimensional model based on the intrinsic parameters, the extrinsic parameters and the second vector to obtain M third vectors; and determining the first vector in the three-dimensional model based on the M third vectors.

12. The vehicle of claim 11, wherein the processor is configured to determine the first vector in the three-dimensional model based on the M third vectors by:

determining a vector group for each third vector to obtain M vector groups, the vector group corresponding to each third vector comprises determined third vectors, from remaining third vectors, that an angle of each of the determined third vectors with respect to any other third vector is smaller than a preset angle;

selecting a vector group comprising a maximum number of determined third vectors the M vector groups as a target vector group; and determining a third vector corresponding to the target vector group and an average vector of all the determined third vectors comprised in the target vector group and determining the average vector as the first vector in the three-dimensional model.

13. A non-transitory computer readable storage medium, having a computer program stored thereon, wherein when the computer program is executed by a processor, a method for determining road information is executed, the method comprising:

obtaining M images, M being an integer greater than or equal to 2;

performing three-dimensional reconstruction based on the M images to obtain a three-dimensional model;

determining a first vector in the three-dimensional model, the first vector being configured to indicate a gravity direction of the three-dimensional model; and determining road information of a road where the vehicle is located based on M spatial positions and the first vector, the M spatial positions being spatial positions of the center of the camera in the three-dimensional model respectively at M time points and the M images are captured by the camera respectively at the M time points, and the road information comprises a slope type and/or a slope value;

wherein determining the road information of the road where the vehicle is located based on the M spatial positions and the first vector comprises:

determining, for any two adjacent spatial positions in the M spatial positions, a fourth vector pointing from a previous spatial position to a subsequent spatial position to obtain (M-1) fourth vectors;

calculating an angle between each fourth vector and the first vector to obtain (M-1) angles; and determining the road information of the road where the vehicle is located based on the (M-1) angles.

14. The non-transitory computer readable storage medium of claim 13, wherein determining the first vector in the three-dimensional model comprises:

determining a second vector in each image to obtain M second vectors; the second vector being configured to indicate a gravity direction of each image; and determining the first vector in the three-dimensional model based on the M second vectors.

15. The non-transitory computer readable storage medium of claim 14, wherein determining the second vector in each image comprises:
- determining, for each image, an intersection of lines projected from parallel vertical straight lines in each image; and
- determining the second vector in each image based on the intersection.

16. The non-transitory computer readable storage medium of claim 14, wherein the three-dimensional model comprises intrinsic parameters of the camera, and extrinsic parameters of the camera corresponding to each image; and
- determining the first vector in the three-dimensional model based on the M second vectors comprises:
- calculating, for each image, a third vector in the three-dimensional model based on the intrinsic parameters, the extrinsic parameters and the second vector to obtain M third vectors; and
- determining the first vector in the three-dimensional model based on the M third vectors.

17. The non-transitory computer readable storage medium of claim 16, wherein determining the first vector in the three-dimensional model based on the M third vectors comprises:
- determining a vector group for each third vector to obtain M vector groups, the vector group corresponding to each third vector comprises determined third vectors, from remaining third vectors, that an angle of each of the determined third vectors with respect to any other third vector is smaller than a preset angle;
- selecting a vector group comprising a maximum number of determined third vectors the M vector groups as a target vector group; and
- determining a third vector corresponding to the target vector group and an average vector of all the determined third vectors comprised in the target vector group and determining the average vector as the first vector in the three-dimensional model.

\* \* \* \* \*